*(12)* United States Patent
Oh et al.

(10) Patent No.: US 11,515,515 B2
(45) Date of Patent: Nov. 29, 2022

(54) METHOD OF PREPARING NEGATIVE ELECTRODE ACTIVE MATERIAL

(71) Applicant: LG CHEM, LTD., Seoul (KR)

(72) Inventors: Il Geun Oh, Daejeon (KR); Eun Kyung Kim, Daejeon (KR); Yong Ju Lee, Daejeon (KR); Rae Hwan Jo, Daejeon (KR); Su Min Lee, Daejeon (KR); Jung Hyun Choi, Daejeon (KR); Dong Hyuk Kim, Daejeon (KR); Se Mi Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 352 days.

(21) Appl. No.: 16/754,388

(22) PCT Filed: Oct. 19, 2018

(86) PCT No.: PCT/KR2018/012435
§ 371 (c)(1),
(2) Date: Apr. 8, 2020

(87) PCT Pub. No.: WO2019/078680
PCT Pub. Date: Apr. 25, 2019

(65) Prior Publication Data
US 2020/0243836 A1  Jul. 30, 2020

(30) Foreign Application Priority Data

Oct. 19, 2017  (KR) .................. 10-2017-0135616
Oct. 19, 2018  (KR) .................. 10-2018-0124981

(51) Int. Cl.
| | | |
|---|---|---|
| *H01M 4/04* | (2006.01) |
| *H01M 4/131* | (2010.01) |
| *H01M 4/58* | (2010.01) |
| *H01M 4/134* | (2010.01) |
| *H01M 10/0525* | (2010.01) |
| *C01B 33/32* | (2006.01) |
| *H01M 4/1395* | (2010.01) |
| *H01M 4/02* | (2006.01) |

(52) U.S. Cl.
CPC .......... *H01M 4/0471* (2013.01); *C01B 33/32* (2013.01); *H01M 4/131* (2013.01); *H01M 4/134* (2013.01); *H01M 4/1395* (2013.01); *H01M 4/58* (2013.01); *H01M 10/0525* (2013.01); *H01M 2004/021* (2013.01); *H01M 2004/027* (2013.01)

(58) Field of Classification Search
CPC .......... H01M 4/04; H01M 4/131; H01M 4/58; H01M 4/134; H01M 10/0525
See application file for complete search history.

(56) References Cited

U.S. PATENT DOCUMENTS

| | | | | |
|---|---|---|---|---|
| 5,395,711 A | * | 3/1995 | Tahara .................. | H01M 10/05 429/231.95 |
| 2012/0258361 A1 | | 10/2012 | Joo et al. | |
| 2013/0052508 A1 | | 2/2013 | Kim et al. | |
| 2016/0351947 A1 | | 12/2016 | Kamo et al. | |
| 2017/0117543 A1 | | 4/2017 | Park et al. | |

FOREIGN PATENT DOCUMENTS

| | | |
|---|---|---|
| JP | 2014-199753 A | 10/2014 |
| JP | 5756781 B2 | 7/2015 |
| JP | 5886923 B1 | 3/2016 |
| JP | 2017-091683 A | 5/2017 |
| KR | 10-2004-0082876 A | 9/2004 |
| KR | 10-1201807 B1 | 11/2012 |
| KR | 10-1243913 B1 | 3/2013 |
| KR | 10-2016-0118258 A | 10/2016 |
| KR | 10-2017-0048211 A | 5/2017 |
| KR | 10-2018-0110512 A | 10/2018 |

OTHER PUBLICATIONS

Machine Translation of: JP 2017/091683 A, Kamo et al., May 25, 2017.*
International Search Report (with partial translation) and Written Opinion issued in corresponding International Patent Application No. PCT/KR2018/012435, dated Apr. 11, 2019.

\* cited by examiner

*Primary Examiner* — Kenneth J Douyette
(74) *Attorney, Agent, or Firm* — Morgan, Lewis & Bockius LLP

(57) ABSTRACT

The present invention relates to a method of preparing a negative electrode active material which includes forming a mixture by mixing $Li_2O$ and $SiO_x(0<x<2)$ particles including $SiO_2$, forming a reaction product by performing a heat treatment on the mixture at 400° C. to 600° C., and removing a portion of lithium silicate in the reaction product by washing the reaction product.

18 Claims, No Drawings

METHOD OF PREPARING NEGATIVE ELECTRODE ACTIVE MATERIAL

CROSS-REFERENCE TO RELATED APPLICATIONS

This application claims the benefit of Korean Patent Application Nos. 10-2017-0135616, filed on Oct. 19, 2017, and 10-2018-0124981, filed on Oct. 19, 2018, in the Korean Intellectual Property Office, the disclosure of which is incorporated herein in its entirety by reference.

TECHNICAL FIELD

Technical Field

The present invention relates to a method of preparing a negative electrode active material, and, specifically, the method of preparing a negative electrode active material may include forming a mixture by mixing $Li_2O$ and $SiO_x$ (0<x<2) particles including $SiO_2$; forming a reaction product by performing a heat treatment on the mixture at 400° C. to 600° C.; and removing a portion of lithium silicate in the reaction product by washing the reaction product.

Background Art

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, i.e., high capacity, have been subjected to considerable research and have been commercialized and widely used.

In general, a secondary battery is composed of a positive electrode, a negative electrode, an electrolyte, and a separator. The negative electrode includes a negative electrode active material in which lithium ions from the positive electrode are intercalated and deintercalated, and $SiO_x$ (0<x<2) having high discharge capacity may be used as the negative electrode active material. However, $SiO_x$(0<x<2) reacts with a lithium source in the battery to form lithium silicate, and the lithium silicate is formed in an irreversible phase so that an amount of the lithium source contributing to charge and discharge of the battery is reduced. Thus, there is a limitation in that initial efficiency of the battery is reduced.

Accordingly, a technique for forming lithium silicate in advance by mixing $SiO_x$(0≤x<2) with lithium metal and performing a heat treatment has been typically used. In this case, since the amount of the lithium source converted to the irreversible phase in the battery may be minimized, the initial efficiency of the battery may be improved.

However, a heat treatment at a high temperature of 900° C. or more is generally required to react the lithium metal with the $SiO_x$(0≤x<2), and a grain size of silicon in the $SiO_x$(0≤x<2) is excessively increased at such a high temperature. Since the grain size of the silicon is excessively increased, there is a limitation in that cycle characteristics of the battery are degraded.

Therefore, there is a need for a method of preparing a negative electrode active material which may prevent the grain size of the silicon from growing excessively while minimizing the formation of the irreversible phase due to the lithium source in the battery.

DISCLOSURE OF THE INVENTION

Technical Problem

An aspect of the present invention provides a method of preparing a negative electrode active material which may prevent a grain size of silicon from growing excessively while minimizing the formation of an irreversible phase due to a lithium source in a battery.

Technical Solution

According to an aspect of the present invention, there is provided a method of preparing a negative electrode active material which includes forming a mixture by mixing $Li_2O$ and $SiO_x$(0<x<2) particles including $SiO_2$; forming a reaction product by performing a heat treatment on the mixture at 400° C. to 600° C.; and removing a portion of lithium silicate in the reaction product by washing the reaction product.

Advantageous Effects

According to a method of preparing a negative electrode active material according to an embodiment of the present invention, since irreversible phase formation due to a lithium source provided from a positive electrode may be minimized by forming lithium silicate in advance by $Li_2O$, initial efficiency of a battery may be improved. Also, since a heat treatment temperature is low at 400° C. to 600° C. during the formation of the lithium silicate, the growth of silicon grains in a negative electrode active material may be suppressed, and thus, life characteristics of the battery may be improved.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A method of preparing a negative electrode active material according to an embodiment of the present invention may include: forming a mixture by mixing $Li_2O$ and $SiO_x$ (0<x<2) particles including $SiO_2$; forming a reaction product by performing a heat treatment on the mixture at 400° C. to 600° C.; and removing a portion of lithium silicate in the reaction product by washing the reaction product.

In the forming of the mixture, the $SiO_x$(0<x<2) particles may include $SiO_2$, and, specifically, may be in the form in which silicon (Si) and $SiO_2$ are included. That is, x corresponds to a ratio of the number of oxygen (0) atoms to Si atoms included in the $SiO_x$(0<x<2) particles.

The $SiO_x$(0<x<2) particles may have an average particle diameter ($D_{50}$) of 3 μm to 10 μm, particularly 3 μm to 7 μm, and more particularly 3 μm to 5 μm. In a case in which the average particle diameter satisfies the above range, since reactivity with $Li_2O$ is improved, reaction efficiency may be increased. In the present specification, the average particle diameter ($D_{50}$) may be defined as a particle diameter at a cumulative number of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

In the forming of the mixture, the $Li_2O$ plays a role in forming lithium silicate by reacting with the $SiO_x$(0<x<2) particles. Accordingly, the formation of an irreversible phase by reaction of a lithium source in a battery, for example, lithium provided from a positive electrode with oxygen in the $SiO_x$(0<x<2) particles may be minimized. Accordingly, initial efficiency of the battery may be improved.

The $Li_2O$ may have an average particle diameter ($D_{50}$) of 1 μm to 10 μm, particularly 1 μm to 5 μm, and more particularly 1 μm to 3 μm. In a case in which the average particle diameter satisfies the above range, reactivity of the $SiO_x$(0<x<2) particles may be improved.

In the forming of the mixture, the $SiO_x$(0<x<2) particles and the $Li_2O$ may be mixed in a weight ratio of 1:0.1 to 1:0.666, and the weight ratio may specifically be in a range of 1:0.25 to 1:0.334. In a case in which the weight ratio is satisfied, since lithium (Li) ions may be sufficiently supplied from the $Li_2O$, lithium silicate, such as $Li_4SiO_4$, may be smoothly formed.

In the forming of the mixture, the mixing may be performed by a conventional method. For example, the mixing may be performed by at least one method selected from methods such as ball milling, stirring, and mortar mixing.

In the forming of the reaction product, a heat treatment temperature of the mixture may be in a range of 400° C. to 600° C., for example, 500° C. to 600° C. With respect to a method in which lithium silicate is formed by reacting lithium metal, instead of $Li_2O$, with the $SiO_x$(0<x<2) particles, the heat treatment temperature is required to be 900° C. or more. However, since silicon grains in the $SiO_x$ (0<x<2) particles excessively grow at a temperature of 900° C. or more, there is a limitation in that life characteristics of the battery are degraded. In contrast, since the $Li_2O$, instead of the lithium metal, reacts with the $SiO_x$(0<x<2) particles in the present invention, the heat treatment temperature for forming the lithium silicate may be relatively low. Accordingly, since the excessive growth of the silicon grains in the $SiO_x$(0<x<2) particles may be prevented, the life characteristics of the battery may be improved.

The heat treatment time may be 3 hours or more, for example, 3 hours to 5 hours. Since a negative electrode active material prepared by using the heat treatment time greater than 5 hours is not significantly different from a negative electrode active material prepared by performing a heat treatment for 3 hours to 5 hours in terms of physical properties, 3 to 5 hours correspond to the most preferable time in consideration of process efficiency.

In the forming of the reaction product, lithium silicate may be formed in the $SiO_x$(0<x<2) particles by performing the heat treatment. Specifically, the lithium silicate may be formed by reaction of $Li_2O$ with $SiO_2$ present on the surface and/or inside of the $SiO_x$(0<x<2) particles. A phenomenon, in which an irreversible phase is formed by reaction of the lithium source in the battery, for example, lithium provided from the positive electrode with the $SiO_x$(0<x<2) particles, may be minimized. Accordingly, the initial efficiency of the battery may be improved.

The lithium silicate may include $Li_4SiO_4$, $Li_2SiO_3$, or $Li_2Si_2O_5$. The $Li_4SiO_4$ corresponds to lithium silicate which is mainly formed when a heat treatment is performed in the heat treatment temperature range of the present invention.

Specifically, the reaction product formed by performing the heat treatment may include $Li_4SiO_4$. The $Li_4SiO_4$ may be included in an amount of 40 wt % to 60 wt %, for example, 40 wt % to 55 wt % based on a total weight of the reaction product. In a case in which the above range is satisfied, since the $SiO_x$(0<x<2) particles are smoothly reduced while a reduction in capacity of the battery is minimized, the initial efficiency may be improved.

The reaction product formed by performing the heat treatment may include at least one of $Li_2SiO_3$ and $Li_2Si_2O_5$. A total amount of the $Li_2SiO_3$ and the $Li_2Si_2O_5$ may be in a range of 0.3 wt % to 4 wt %, for example, 0.5 wt % to 3 wt % based on the total weight of the reaction product formed by performing the heat treatment. In a case in which the above range is satisfied, the initial efficiency may be improved while the reduction in the capacity of the battery is minimized.

In the removing of the portion of the lithium silicate in the reaction product by washing the reaction product, the washing may be performed using water. The removed silicate may include $Li_4SiO_4$. The $Li_4SiO_4$ formed in the preparation method of the present invention is lithium silicate that may be easily washed by water. Thus, the $Li_4SiO_4$ may be easily removed from the reaction product by using water even if there is no separate material, for example, acid such as HCl. Accordingly, a process of preparing a negative electrode active material may be simplified. Also, since the $Li_2SiO_3$ and $Li_2Si_2O_5$ are not water-soluble lithium silicates, the $Li_2SiO_3$ and $Li_2Si_2O_5$ remain in the negative electrode active material without being removed during the washing with water. The initial efficiency of the battery may be improved by an appropriate amount of the $Li_2SiO_3$ and $Li_2Si_2O_5$.

A negative electrode active material according to another embodiment of the present invention is a negative electrode active material prepared by the above-described method of preparing a negative electrode active material. In addition, a negative electrode according to another embodiment of the present invention may include a current collector and a negative electrode active material layer disposed on the current collector. The negative electrode active material layer may include the negative electrode active material. Furthermore, the negative electrode active material layer may further include a binder and/or a conductive agent.

The current collector is not particularly limited as long as it has conductivity without causing adverse chemical changes in the battery. For example, copper, stainless steel, aluminum, nickel, titanium, fired carbon, or aluminum or stainless steel that is surface-treated with one of carbon, nickel, titanium, silver, or the like may be used as the current collector. Specifically, a transition metal that adsorbs carbon well, such as copper or nickel, may be used as the current collector. The current collector may have a thickness of 6 μm to 20 μm, but the thickness of the current collector is not limited thereto.

The binder may include at least one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, polyacrylic acid, and polymers in which hydrogen thereof is substituted with lithium (Li), sodium (Na), or calcium (Ca), and may also include various copolymers thereof.

The conductive agent is not particularly limited as long as it has conductivity without causing adverse chemical changes in the battery, and, conductive materials, for example, graphite such as natural graphite and artificial graphite; carbon black such as acetylene black, Ketjen black, channel black, furnace black, lamp black, and thermal black; conductive fibers such as carbon fibers or metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

A secondary battery according to another embodiment of the present invention may include a negative electrode, a positive electrode, a separator disposed between the positive electrode and the negative electrode, and an electrolyte, and the negative electrode is the same as the above-described negative electrode. Since the negative electrode has been described above, detailed descriptions thereof will be omitted.

The positive electrode may include a positive electrode collector and a positive electrode active material layer which is formed on the positive electrode collector and includes a positive electrode active material.

In the positive electrode, the positive electrode collector is not particularly limited as long as it has conductivity without causing adverse chemical changes in the batteries, and, for example, stainless steel, aluminum, nickel, titanium, fired carbon, or aluminum or stainless steel that is surface-treated with one of carbon, nickel, titanium, or silver may be used. Also, the positive electrode collector may typically have a thickness of 3 μm to 500 μm and may have a surface with fine roughness to improve adhesion to the positive electrode active material. The positive electrode collector may be used in various shapes, for example, a film, a sheet, a foil, a net, a porous body, a foam body, a non-woven fabric body, and the like.

The positive electrode active material may be a typically used positive electrode active material. Specifically, the positive electrode active material may include a layered compound, such as lithium cobalt oxide ($LiCoO_2$) or lithium nickel oxide ($LiNiO_2$), or a compound substituted with one or more transition metals; lithium iron oxides such as $LiFe_3O_4$; lithium manganese oxides such as $Li_{1+c1}Mn_{2-c1}O_4$ ($0 \leq c \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; nickel (Ni)-site type lithium nickel oxide expressed by a chemical formula of $LiNi_{1-c2}M_{c2}O_2$ (where M is at least one selected from the group consisting of cobalt (Co), manganese (Mn), aluminum (Al), copper (Cu), iron (Fe), magnesium (Mg), boron (B), and gallium (Ga), and c2 satisfies $0.01 \leq c2 \leq 0.3$); lithium manganese composite oxide expressed by a chemical formula of $LiMn_{2-c3}M_{c3}O_2$ (where M is at least one selected from the group consisting of Co, Ni, Fe, chromium (Cr), zinc (Zn), and tantalum (Ta), and c3 satisfies $0.01 \leq c3 \leq 0.1$) or $Li_2Mn_3MO_8$ (where M is at least one selected from the group consisting of Fe, Co, Ni, Cu, and Zn); and $LiMn_2O_4$ having a part of Li being substituted with alkaline earth metal ions, but the positive electrode active material is not limited thereto. The positive electrode may be Li-metal.

The positive electrode active material layer may include a positive electrode conductive agent and a positive electrode binder as well as the above-described positive electrode active material.

In this case, the positive electrode conductive agent is used for providing conductivity to the electrode, wherein any conductive agent may be used without particular limitation as long as it has electronic conductivity without causing adverse chemical changes in the battery. Specific examples of the positive electrode conductive agent may be graphite such as natural graphite and artificial graphite; a carbon-based material such as carbon black, acetylene black, Ketjen black, channel black, furnace black, lamp black, thermal black, and carbon fibers; metal powder, such as copper powder, nickel powder, aluminum powder, and silver powder, or metal fibers; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

Also, the positive electrode binder functions to improve binding between positive electrode active material particles and adhesion between the positive electrode active material and the positive electrode collector. Specific examples of the positive electrode binder may be polyvinylidene fluoride (PVDF), a polyvinylidene fluoride-hexafluoropropylene copolymer (PVDF-co-HEP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluoro rubber, or various copolymers thereof, and one alone or a mixture of two or more thereof may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used.

Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, ethylene carbonate and propylene carbonate, ring-type carbonates among the carbonate-based organic solvents, well dissociate a lithium salt in the electrolyte solution due to high dielectric constants as high-viscosity organic solvents, and thus, the ring-type carbonate may be preferably used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate may be more preferably used.

A lithium salt may be used as the metal salt, and the lithium salt is material that is readily soluble in the non aqueous electrolyte solution, wherein, for example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, preferred examples will be provided for better understanding of the present invention. It will be apparent to those skilled in the art that these examples are only provided to illustrate the present invention and various modifications and alterations are possible within the scope and technical spirit of the present invention. Such modifications and alterations fall within the scope of claims included herein.

EXAMPLE AND COMPARATIVE EXAMPLES

Example 1: Preparation of Battery (1) Preparation of Negative Electrode Active Material
1) Formation of Mixture of $SiO_x(0<x<2)$ Particles and $Li_2O$ 3 g of SiO particles having an average particle diameter ($D_{50}$) of 5 μm and 1 g of $Li_2O$ having an average particle diameter ($D_{50}$) of 3 μm were stirred for 30 minutes by using a ball mill to form a mixture.

2) Heat Treatment Process 3 g of the mixture was introduced into a reaction furnace, a temperature of the reaction furnace was set to 550° C., and the mixture was heat-treated for 3 hours to form a reaction product. An amount of each lithium silicate in the formed reaction product is listed in Table 1.

3) Removal of Lithium Silicate

The reaction product was added to water and stirred (washed) for 30 minutes to remove a portion of the lithium silicate in the reaction product. As a result, a negative electrode active material of Example 1 was prepared. A size of silicon grains in the prepared negative electrode active material is listed in Table 1.

(2) Preparation of Negative Electrode

The prepared negative electrode active material, graphite, carbon black as a conductive agent, and carboxylmethyl cellulose (CMC) and styrene butadiene rubber (SBR), as a binder, were mixed in a weight ratio of 4.8:91:1:1.7:1.5 to prepare 5 g of a mixture. A negative electrode slurry was prepared by adding 28.9 g of distilled water to the mixture. A 20 μm thick copper (Cu) thin film, as a negative electrode collector, was coated with the negative electrode slurry and dried. In this case, a temperature of circulating air was 60° C. Subsequently, the coated negative electrode collector was roll-pressed, dried in a vacuum oven at 130° C. for 12 hours, and then punched into a circle having an area of 1.4875 $cm^2$ to prepare a negative electrode.

(3) Preparation of Secondary Battery

The prepared negative electrode was used and a lithium (Li)-metal thin film cut into a circle of area 1.7671 $cm^2$ was used as a positive electrode. A porous polyethylene separator was disposed between the positive electrode and the negative electrode, and a lithium coin half-cell was prepared by injecting an electrolyte solution in which 0.5 wt % vinylene carbonate was dissolved and 1 M $LiPF_6$ was dissolved in a mixed solution in which a mixing volume ratio of ethyl methyl carbonate (EMC) to ethylene carbonate (EC) was 7:3.

Example 2: Preparation of Battery

A negative electrode active material, a negative electrode, and a secondary battery were prepared in the same manner as in Example 1 except that the reaction furnace temperature was set to 450° C. in the heat treatment process of Example 1.

Example 3: Preparation of Battery

A negative electrode active material, a negative electrode, and a secondary battery were prepared in the same manner as in Example 1 except that the heat treatment time was set to 5 hours in the heat treatment process of Example 1.

Example 4: Preparation of Battery

A negative electrode active material, a negative electrode, and a secondary battery were prepared in the same manner as in Example 1 except that the heat treatment time was set to 6 hours in the heat treatment process of Example 1.

Comparative Example 1: Preparation of Battery

A negative electrode active material, a negative electrode, and a secondary battery were prepared in the same manner as in Example 1 except that the reaction furnace temperature was set to 900° C. in the heat treatment process of Example 1.

Comparative Example 2: Preparation of Battery

A negative electrode active material, a negative electrode, and a secondary battery were prepared in the same manner as in Example 1 except that the reaction furnace temperature was set to 300° C. in the heat treatment process of Example 1.

Comparative Example 3: Preparation of Battery

A negative electrode active material, a negative electrode, and a secondary battery were prepared in the same manner as in Example 1 except that the reaction furnace temperature was set to 650° C. in the heat treatment process of Example 1.

Comparative Example 4: Preparation of Battery (1) Preparation of Negative Electrode Active Material 1) Formation of Mixture of $SiO_x(0<x<2)$ Particles and $Li_2O$ 3 g of SiO particles having an average particle diameter ($D_{50}$) of 5 μm and 0.92 g of Li having an average particle diameter ($D_{50}$) of 20 μm were stirred for 30 minutes by using a ball mill to form a mixture.

2) Heat Treatment Process 3 g of the mixture was introduced into a reaction furnace, a temperature of the reaction furnace was set to 550° C., and the mixture was heat-treated for 3 hours to form a reaction product. An amount of $Li_4SiO_4$ in the reaction product is listed in Table 1.

3) Removal of Lithium Silicate

The reaction product was added to water and stirred (washed) for 30 minutes to remove a portion of the lithium silicate in the reaction product. As a result, a negative electrode active material of Comparative Example 4 was prepared. A size of silicon grains in the prepared negative electrode active material is listed in Table 1.

(2) Preparation of Negative Electrode and Secondary Battery

A negative electrode and a secondary battery were prepared in the same manner as in Example 1.

Comparative Example 5: Preparation of Battery

A negative electrode active material, a negative electrode, and a secondary battery were prepared in the same manner as in Comparative Example 4 except that the reaction furnace temperature was set to 900° C. in the heat treatment process of Comparative Example 4.

TABLE 1

| | Amount of $Li_4SiO_4$ (wt %) | Amount of $Li_2SiO_3$ (wt %) | Amount of $Li_2Si_2O_5$ (wt %) | Silicon grain size (nm) |
|---|---|---|---|---|
| Example 1 | 48.7 | 0.8 | 2.0 | 0 |
| Example 2 | 42.1 | 0.3 | 0.5 | 0 |
| Example 3 | 48.6 | 0.8 | 2.0 | 0 |
| Example 4 | 48.7 | 0.8 | 1.9 | 0 |
| Comparative Example 1 | 30.7 | 14.0 | 22.3 | 11.3 |
| Comparative Example 2 | 23.1 | 0.4 | 0.8 | 0 |
| Comparative Example 3 | 40.6 | 2.5 | 3.1 | 6.6 |
| Comparative Example 4 | 7.3 | 3.2 | 3.2 | 0 |
| Comparative Example 5 | 25.8 | 11.4 | 11.4 | 11.1 |

In Table 1, the amounts of the lithium silicates were amounts based on a total weight of the reaction product before the washing after the heat treatment, and were measured by X-ray diffraction (XRD) quantitative analysis. Also, the size of the silicon grains in Table 1 was measured by XRD using the Scherrer equation.

Experimental Example 1: Evaluation of Discharge Capacity, Initial Efficiency, and Capacity Retention The secondary batteries of Examples 1 to 4 and Comparative Examples 1 to 5 were charged and discharged to evaluate discharge capacity, initial efficiency, and capacity retention, and the results thereof are listed in Table 2 below.

In $1^{st}$ cycle and $2^{nd}$ cycle, the secondary batteries were charged and discharged at 0.1 C, and charging and discharging were performed at 0.5 C from a $3^{rd}$ cycle to a $49^{th}$ cycle. A $50^{th}$ cycle was terminated in a charged state (state in which lithium was included in the negative electrode).

Charge condition: CC (constant current)/CV (constant voltage) (5 mV/0.005 C current cut-off)

Discharge condition: CC (constant current) condition 1.5 V

The discharge capacity (mAh/g) and the initial efficiency (%) were derived from the results during the first charge and discharge cycle. Specifically, the initial efficiency (%) was derived by the following calculation.

Initial efficiency(%)=(discharge capacity after the $1^{st}$ discharge/$1^{st}$ charge capacity)×100

The capacity retention was derived by the following calculation.

Capacity retention(%)=(discharge capacity in the $49^{th}$ cycle/discharge capacity in the first cycle)×100

TABLE 2

| Battery | Discharge capacity (mAh/g) | Initial efficiency (%) | Capacity retention (%) |
|---|---|---|---|
| Example 1 | 405.5 | 89.9 | 73.2 |
| Example 2 | 405.2 | 89.6 | 72.9 |
| Example 3 | 405.5 | 89.8 | 73.1 |
| Example 4 | 405.4 | 89.9 | 73.2 |
| Comparative Example 1 | 398.1 | 89.5 | 68.9 |
| Comparative Example 2 | 401.6 | 86.0 | 70.1 |
| Comparative Example 3 | 404.0 | 89.6 | 69.5 |
| Comparative Example 4 | 400.8 | 86.2 | 70.3 |
| Comparative Example 5 | 405.3 | 89.6 | 67.1 |

Referring to Tables 1 and 2, with respect to Examples 1 to 4 in which $Li_2O$ was used and appropriate temperatures of 550° C. and 450° C. were used, it may be understood that capacity retentions were high because silicon grains were not formed. Also, with respect to Examples 1 to 4, since the amount of water-soluble lithium silicate ($Li_4SiO_4$), as an intermediate product (before washing), was large, reduction of SiO was smoothly performed, and thus, it may be understood that battery capacity may be improved. In addition, since appropriate amounts of $Li_2SiO_3$ and $Li_2Si_2O_5$, which were not washed by water, were present, it was confirmed that initial efficiency may be improved. With respect to Comparative Example 1 in which $Li_2O$ was used and a high temperature of 900° C. was used, since silicon grains were excessively grown, it may be understood that capacity retention was low. Furthermore, since excessively large amounts of the $Li_2SiO_3$ and $Li_2Si_2O_5$ were present, it was confirmed that capacity characteristics of the battery were extremely poor.

Also, with respect to Comparative Example 3 in which $Li_2O$ was used and a high temperature of 650° C. was used, silicon grains were excessively grown, and capacity retention was low. Furthermore, since excessively large amounts of $Li_2SiO_3$ and $Li_2Si_2O_5$ were present, it was confirmed that capacity characteristics of the battery were poor.

With respect to Comparative Example 2, in which $Li_2O$ was used and a low temperature of 300° C. was used, and Comparative Example 4 in which Li was used and a low temperature of 550° C. was used, silicon grains were not found, but, in terms of the fact that a small amount of $Li_4SiO_4$ was formed, it may be understood that the reduction of SiO was not smoothly performed. Accordingly, an effect of improving initial efficiency, discharge capacity, and capacity retention was insignificant.

With respect to Comparative Example 4 in which Li was used and the heat treatment was performed at 550° C., since excessively large amounts of $Li_2SiO_3$ and $Li_2Si_2O_5$ were present, it was confirmed that capacity characteristics of the battery were poor.

With respect to Comparative Example 5 in which Li was used and the heat treatment was performed at a high temperature of 900° C., since a large amount of the lithium silicate was formed, there was an effect of increasing the initial efficiency, but it may be understood that capacity retention was low because grains were excessively grown.

When Example 1 and Example 2 were compared, it may be understood that the discharge capacity, initial efficiency, and capacity retention of Example 1, which was heat-treated at 550° C., were better than those of Example 2 which was heat-treated at 450° C. Also, when Example 1, Example 3, and Example 4 were compared, it may be understood that Example 4, in which the heat treatment time was greater than 5 hours, had an effect equivalent to that of Example 1, in which the heat treatment was performed for 3 hours, and Example 3 in which the heat treatment was performed for 5 hours. Therefore, for process efficiency, the performance of the 3 to 5 hours heat treatment seems to be the most desirable.

The invention claimed is:

1. A method of preparing a negative electrode active material, the method comprising:
   forming a mixture by mixing $Li_2O$ and $SiO_x$ (0<x<2) particles including $SiO_2$;
   forming a reaction product by heat treating the mixture at 400° C. to 600° C.; and
   removing at least a portion of lithium silicate from the reaction product,
   wherein, in the forming of the reaction product, the reaction product comprises 40 wt % to 60 wt % of $Li_4SiO_4$ based on a total weight of the reaction product.

2. The method of claim 1, wherein the heat treatment is performed at 500° C. to 600° C.

3. The method of claim 1, wherein the heat treatment is performed for 3 hours to 5 hours.

4. The method of claim 1, wherein the removed lithium silicate comprises $Li_4SiO_4$.

5. The method of claim 1, wherein, in the forming of the reaction product,
   the reaction product comprises at least one of $Li_2SiO_3$ or $Li_2Si_2O_5$, and
   a total amount of the $Li_2SiO_3$ and the $Li_2Si_2O_5$ is in a range of 0.3 wt % to 4 wt % based on a total weight of the reaction product.

6. The method of claim 1, wherein the removing comprises washing using water.

7. The method of claim 1, wherein, in the forming of the mixture,
   the $SiO_x$ (0<x<2) particles and the $Li_2O$ particles are mixed in a weight ratio of 1:0.1 to 1:0.666.

8. The method of claim 1, wherein the $SiO_x$ (0<x<2) particles have an average particle diameter ($D_{50}$) of 3 μm to 10 μm.

9. The method of claim 1, wherein the $Li_2O$ particles have an average particle diameter ($D_{50}$) of 1 μm to 10 μm.

10. The method of claim 1, wherein, in the forming of the reaction product, the reaction product comprises $Li_2SiO_3$.

11. The method of claim 1, wherein, in the forming of the reaction product, the reaction product comprises $Li_2Si_2O_5$.

12. The method of claim 1, wherein the $SiO_x$ (0<x<2) particles have an average particle diameter ($D_{50}$) of 3 μm to 7 μm.

13. The method of claim 1, wherein the $SiO_x$ (0<x<2) particles have an average particle diameter ($D_{50}$) of 3 μm to 5 μm.

14. The method of claim 1, wherein the $Li_2O$ particles have an average particle diameter ($D_{50}$) of 1 μm to 5 μm.

15. The method of claim 1, wherein the $Li_2O$ particles have an average particle diameter ($D_{50}$) of 1 μm to 3 μm.

16. The method of claim 1, wherein, in the forming of the mixture,
   the $SiO_x$ (0<x<2) particles and the $Li_2O$ particles are mixed in a weight ratio of 1:0.25 to 1:0.334.

17. The method of claim 1, wherein the reaction product comprises 40 wt % to 55 wt % of $Li_4SiO_4$ based on a total weight of the reaction product.

18. The method of claim 1, wherein, in the forming of the reaction product,
   the reaction product comprises at least one of $Li_2SiO_3$ or $Li_2Si_2O_5$, and a total amount of the $Li_2SiO_3$ and the $Li_2Si_2O_5$ is in a range of 0.5 wt % to 3 wt % based on a total weight of the reaction product.

\* \* \* \* \*